United States Patent
Oliver et al.

(10) Patent No.: US 8,141,132 B2
(45) Date of Patent: Mar. 20, 2012

(54) DETERMINING AN INVALID REQUEST (75) Inventors: Ian Oliver, Manly Vale (AU); Ryan Pereira, Cremorne (AU)

(73) Assignee: Symantec Corporation, Mountain View, CA (US)

( * ) Notice: Subject to any disclaimer, the term of this patent is extended or adjusted under 35 U.S.C. 154(b) by 1400 days.

(21) Appl. No.: 11/504,275

(22) Filed: Aug. 15, 2006

(65) Prior Publication Data
US 2008/0046970 A1  Feb. 21, 2008

(51) Int. Cl.
H04L 29/06 (2006.01)
(52) U.S. Cl. ............. 726/3; 709/224; 709/227; 370/389
(58) Field of Classification Search .................. 726/3, 22
See application file for complete search history.

(56) References Cited

U.S. PATENT DOCUMENTS

| | | | | |
|---|---|---|---|---|
| 2006/0070126 A1* | 3/2006 | Grynberg | .......................... | 726/22 |
| 2006/0123464 A1* | 6/2006 | Goodman et al. | ................. | 726/2 |
| 2006/0123478 A1* | 6/2006 | Rehfuss et al. | ................. | 726/22 |
| 2006/0251068 A1* | 11/2006 | Judge et al. | ..................... | 370/389 |
| 2007/0005984 A1* | 1/2007 | Florencio et al. | ............. | 713/178 |
| 2007/0107054 A1* | 5/2007 | Averbuch et al. | ................ | 726/22 |
| 2007/0118898 A1* | 5/2007 | Morgan et al. | ................... | 726/22 |
| 2008/0141342 A1* | 6/2008 | Curnyn | .............................. | 726/3 |

OTHER PUBLICATIONS

Online Identity Theft_Phishing_Countermeasures|http://www.antiphishing.org/Phishing-dhs-report.pdf|Aaron Emigh| Radix Labs|Oct. 3, 2005.*

* cited by examiner

*Primary Examiner* — Taghi Arani
*Assistant Examiner* — Mahfuzur Rahman
(74) *Attorney, Agent, or Firm* — Holland & Hart LLP (57) ABSTRACT

A method of determining an indication of an invalid request, the method including the steps of, in a processing system: receiving data at step 100, comparing at least a portion of the received data to predetermined criteria at step 110, determining an indication of an invalid request included in the data at step 120, and generating a notification in accordance with the determined invalid request at step 140.

16 Claims, 4 Drawing Sheets

DETERMINING AN INVALID REQUEST

TECHNICAL FIELD

The present invention generally relates to the field of computing, and more particularly to a method, system, computer readable medium of instructions and/or computer program product for identifying or determining an invalid request, such as a "phishing" request.

BACKGROUND ART

In processing systems, and in particular, in networked systems, it is often the case that users may unintentionally supply information to an illegitimate entity. The act of deceiving a person into divulging information, or to act in an abnormal way, is commonly referred to as "phishing".

Phishing is a form of Internet fraud that usually includes an illegitimate entity creating an illegitimate or fraudulent website which is similar to, or a replica of, a legitimate entity's website, such as a financial institution, bank, or insurance company. The illegitimate entity then sends an email requesting that the recipient access the illegitimate website and enter their personal information, such as an account number and password. The illegitimate entity may then use the personal information to gain access to the person's personal data and/or assets. This can also lead to identity fraud.

Thus, in one example, a user may receive an email from what they believe to be their banking institution, where the email requests confirmation of the user's account information. In replying to the illegitimate email, the user may subject themselves to identity or monetary theft. In another example, the user may be directed to an illegitimate website, which appears to be the official website for the user's banking institution. The illegitimate website may then deceive the user into entering information such as their account number and password, which is then recorded and used by the illegitimate entity.

In a networked information or data communications system, a user has access to one or more terminals which are capable of requesting and/or receiving information or data from local or remote information sources. An example of a networked information or data communication system is the Internet.

In such a communications system, a terminal may be any type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

There exists a need for a method, system, computer readable medium of instructions, and/or a computer program product to identify and/or determine an invalid request, such as a phishing request, which addresses or at least ameliorates one or more problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

According to a first broad form, there is provided a processing system for determining an indication of an invalid request, the processing system able to receive data, compare at least a portion of the received data to predetermined criteria, determine an indication of an invalid request included in the data, and generate a notification in accordance with the determined indication of the invalid request.

According to a second broad form, there is provided a computer program product for determining an indication of an invalid request, the computer program product configured to:
a) receive data;
b) compare at least a portion of the received data to predetermined criteria;
c) determine an indication of an invalid request included in the data; and,
d) generate a notification in accordance with the determined indication of the invalid request.

According to a third broad form, there is provided a method of determining an indication of an invalid request, the method including the steps of, in a processing system:
a) receiving data;
b) comparing at least a portion of the received data to predetermined criteria;
c) determining an indication of an invalid request included in the data; and,
d) generating a notification in accordance with the determined indication of the invalid request.

According to a fourth broad form, there is provided a method of determining a level of invalidity, the method including the steps of, in a processing system:
a) receiving an indication of an invalid request;
b) analysing the indication of the invalid request; and,
c) determining the level of invalidity in accordance with the analysis.

According to a fifth broad form, there is provided a method of determining an indication of an invalid request, the method including the steps of, in a processing system:
a) receiving data;
b) comparing at least a portion of the received data to predetermined criteria;
c) determining an indication of an invalid request included in the data;
d) sending a notification in accordance with the determined indication of the invalid request to a central server; and,
e) receiving an analysis of the indication of the invalid request from the central server.

According to another aspect, the method further includes, transmitting the notification to a second processing system.

In accordance with another form, the method further includes, in the second processing system:
 a) analysing the notification; and,
 b) generating a report in accordance with the analysis.

In particular, the method further includes in the second processing system:
 a) monitoring a status of the invalid request; and,
 b) updating the status of the invalid request.

In a preferable form, the data received is electronic mail.

In anther aspect, the predetermined criteria includes whether the data includes any one or combination of:
 a) a trusted logo;
 b) a particular image;
 c) a particular keyword;
 d) a particular term;
 e) a hyperlink;
 f) an attached executable file;
 g) a spelling mistake;
 h) a particular domain;
 i) a particular Internet Protocol address; and,
 j) a particular Internet Protocol owner.

In accordance with yet, another aspect, the predetermined criteria includes whether the data does not include any one or combination of:
 a) a trusted logo;
 b) a particular image;
 c) a particular keyword;
 d) a particular term;
 e) a hyperlink;
 f) an attached executable file;
 g) a spelling mistake;
 h) a particular domain;
 i) a particular Internet Protocol address; and,
 j) a particular Internet Protocol owner.

According to another form, generating the notification of the invalid request includes notifying a user of the invalid request.

According to a preferred aspect, the second processing system is a central server.

In accordance with another form, analysing the notification includes:
 a) determining if similar notifications have been received from other users in respect of similar data; and,
 b) determining a status invalidity.

In accordance with another example, generating a report in accordance with the analysis includes any one or combination of:
 a) notifying affected users of the status of the invalidity; and,
 b) notifying a third party of the status of the invalidity.

In a preferred form, monitoring the status of the indication includes:
 a) storing the data as quarantined data; and,
 b) determining if similar notifications have been received from other users in respect of similar data.

In one other example, the method further includes sending a report to a user in accordance with the updated status of the indication.

According to another aspect, it is determined whether the data is a phishing email.

According to other forms, the present invention provides a computer readable medium of instructions or a computer program product for giving effect to any of the methods or systems mentioned herein. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Figure 1:
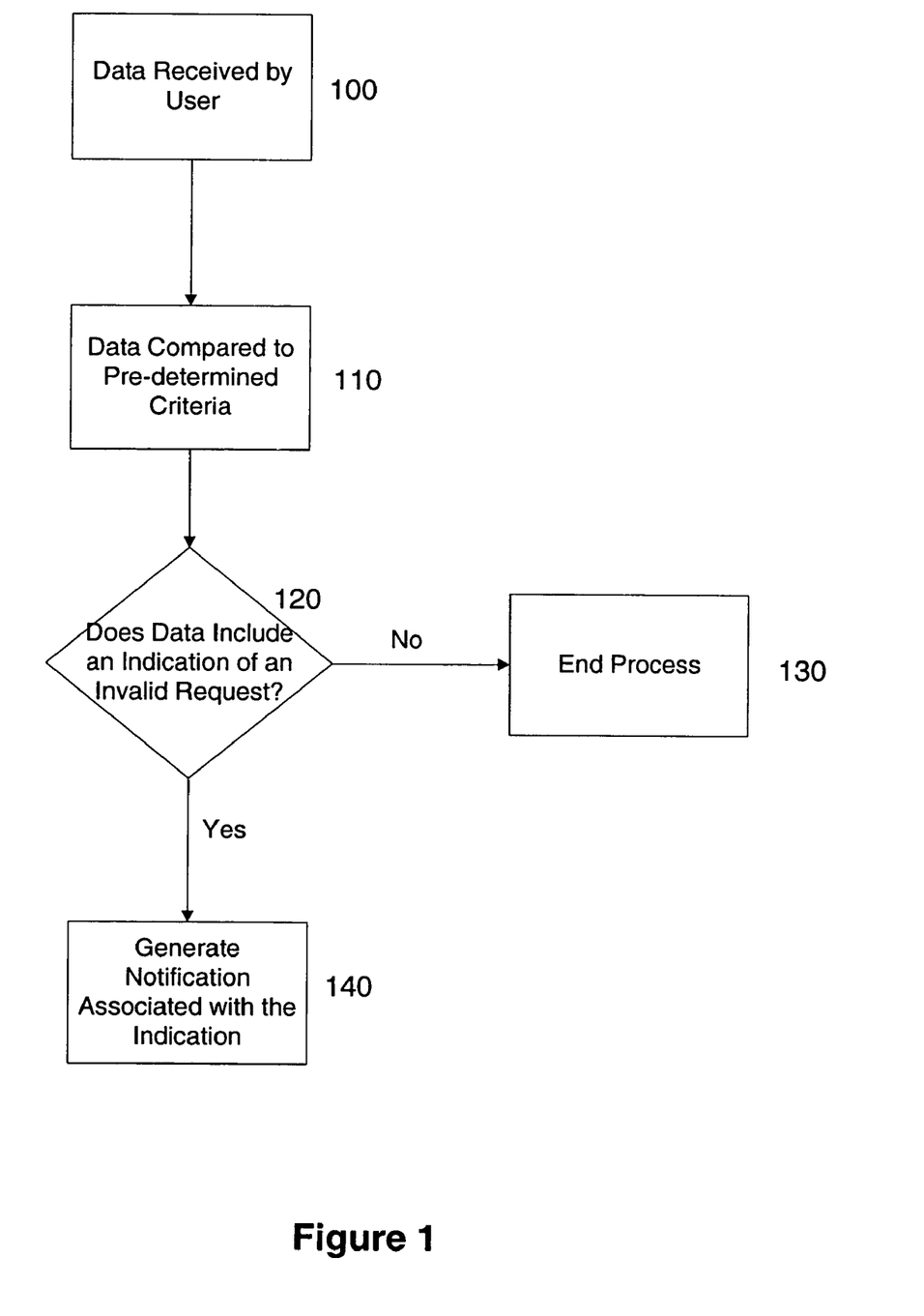
FIG. 1 illustrates a flow diagram of an example method for determining an indication of an invalid request.

A method of determining an indication of an invalid request is illustrated in FIG. 1. The method generally includes at step 100 a user (or a processing system, as will be described below) receiving data. At step 110, the data received is compared to predetermined criteria. At step 120, the method includes determining whether the data includes an indication of an invalid request. If the data does not include an indication of an invalid request, the process ends at step 130. However, if the data does include an indication of an invalid request, the process continues to step 140 where a notification is generated associated with the indication.

Figure 2:
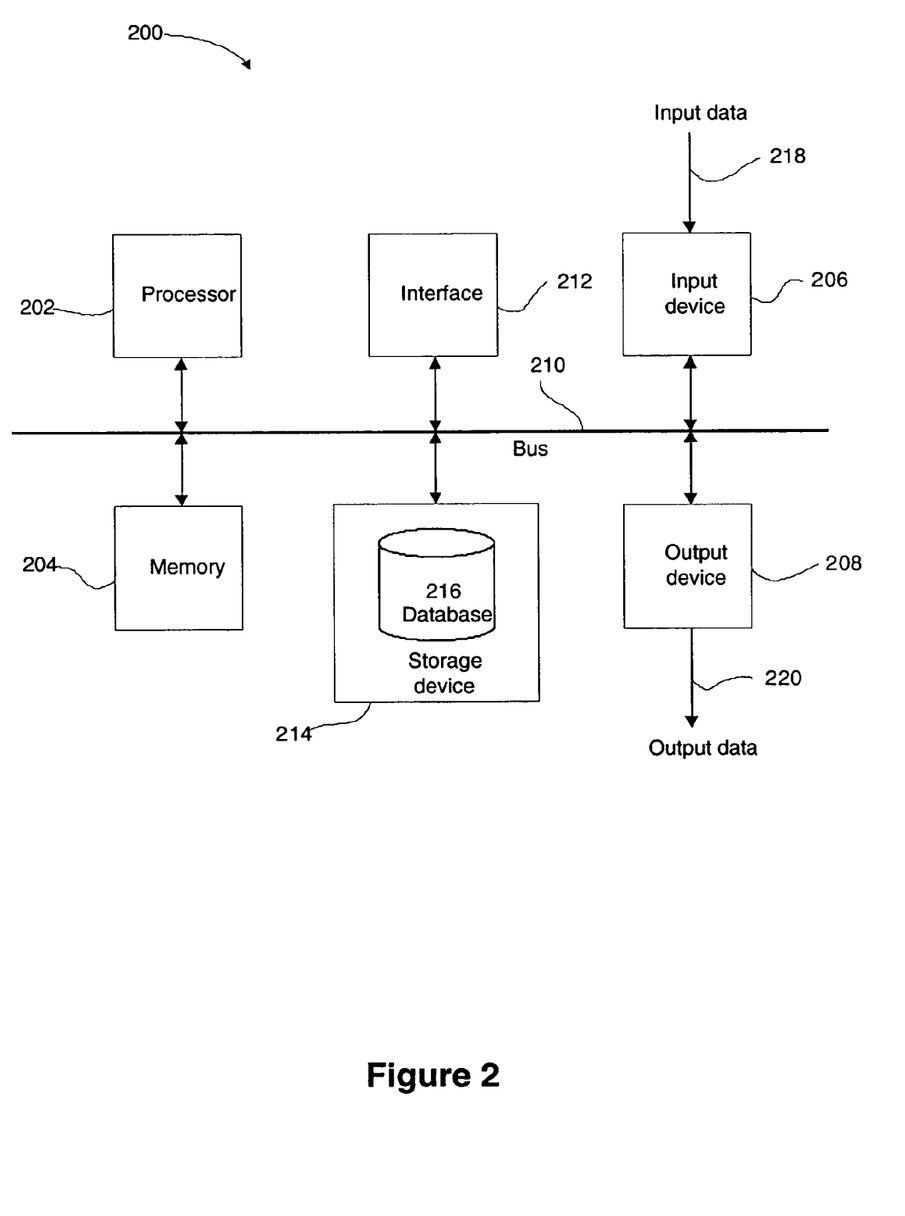
FIG. 2 illustrates a functional block diagram of an example processing system that can be utilised to embody or give effect to a particular embodiment.

The process illustrated FIG. 1 can be realised using a processing system, an example of which is shown in FIG. 2. In particular, processing system 200 generally includes at least one processor 202, or processing unit or plurality of processors, memory 204, at least one input device 206 and at least one output device 208, coupled together via a bus or group of buses 210. In certain embodiments, input device 206 and output device 208 could be the same device. An interface 212 can also be provided for coupling processing system 200 to one or more peripheral devices, for example interface 212 could be a PCI card or PC card. At least one storage device 214 which houses at least one database 216 can also be provided. The memory 204 can be any form of memory device, for example, volatile or non-volatile memory, solid state storage devices, magnetic devices, etc. The processor 202 could include more than one distinct processing device, for example to handle different functions within the processing system 200.

Input device 206 receives input data 218 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 218 could come from different sources, for example keyboard instructions in conjunction with data received via a network. Output device 208 produces or generates output data 220 and can include, for example, a display device or monitor in which case output data 220 is visual, a printer in which case output data 220 is printed, a port for example a USB port, a peripheral component adaptor, a data transmitter or antenna such as a modem or wireless network adaptor, etc. Output data 220 could be distinct and derived from different output devices, for example a visual display on a monitor in conjunction with data transmitted to a network. A user could view data output, or an interpretation of the data output, on, for example, a monitor or using a printer. The storage device 214 can be any form of data or information storage means, for example, volatile or non-volatile memory, solid state storage devices, magnetic devices, etc.

In use, the processing system 200 is adapted to allow data or information to be stored in and/or retrieved from, via wired or wireless communication means, the at least one database 216, and can also allow for processes or software modules to be executed. The interface 212 may allow wired and/or wireless communication between processing unit 202 and peripheral components that may serve a specialised purpose. The processor 202 receives instructions as input data 218 via input device 206 and can display processed results or other output to a user by utilising output device 208. More than one input device 206 and/or output device 208 can be provided. It should be appreciated that the processing system 200 may be any form of terminal, server, specialised hardware, or the like.

Processing system 200 may be an isolated system when determining an indication of an invalid request. However, if appropriate, processing system 200 may be a part of a networked communications system. Processing system 200 could connect to a network, for example the Internet or a WAN. Input data 218 and/or output data 220 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing system 200 can receive data, compare at least a portion of the received data to predetermined criteria, determine an indication of an invalid request included in the data, and generate a notification in accordance with the determined invalid request.

Thus, in one example, the processing system 200 can be a user's terminal or the like, where the data received by the user can be, or be representative of, a website, an email, a document, or the like.

The processing system 200 can then compare at least a portion of the received data to predetermined criteria. Thus, for example, if the data received by a user is an email, the processing system 200 can compare at least a portion of the email, such as particular words or terms appearing in the email, or images in the email, to predetermined criteria.

Accordingly, the predetermined criteria may include rules or criteria that have been defined by the user, by a central authority responsible for the process executing on the processing system 200, or by a third party. The predetermined criteria can include whether or not certain qualifications exist in the email, and in one particular example, the predetermined criteria includes heuristics.

Thus, for example, the processing system 200 may compare a logo appearing in the email to a list of trusted logos stored in a memory associated with the processing system 200. If it is found that a logo appearing in the email is slightly different when compared to a trusted logo, then the processing system 200 can determine that there is an indication of an invalid request in respect of the received data (i.e. the email).

The indication of an invalid request can thus be an indication or determination that the data received may be phishing the user for user information, such as a user's name or password, an indication that the data received is from an illegitimate source or entity, or an indication that the user may be directed to an illegitimate information source (such as a website or the like).

The processing system 200 can then generate a notification in accordance with the determined indication/invalid request. The notification generated by the processing system 200 can alert the user to the indication of an invalid request. The user can then deal with the determined notification accordingly (such as by ignoring the notification, by notifying others of the illegitimate data received and of the invalid request, deleting the illegitimate data, or attempting to obtain legitimate data).

Figure 3A:
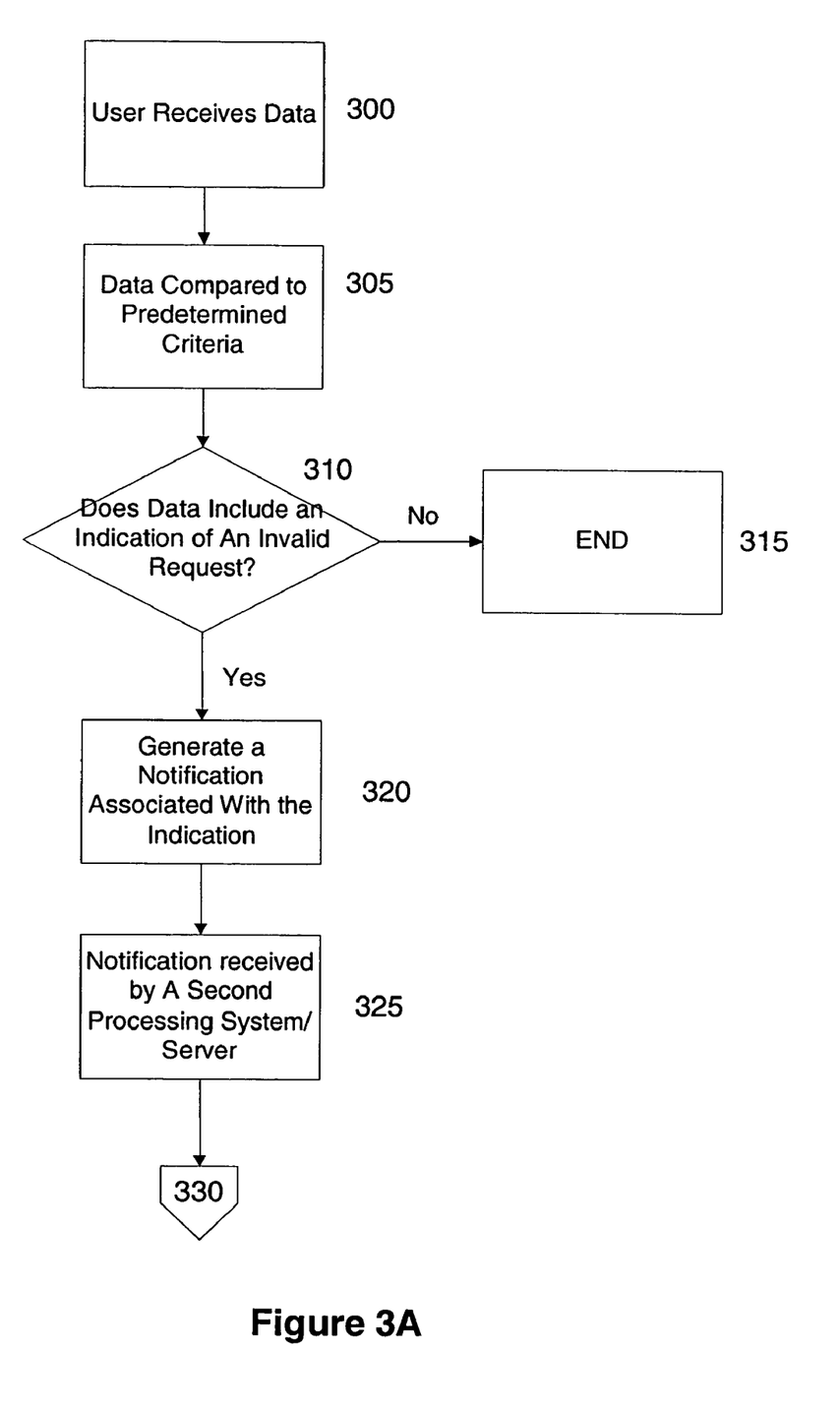
FIG. 3A illustrates a flow diagram of a further example for determining an indication of an invalid request; and, FIG. 3B illustrates a flow diagram that is a continuation of the flow diagram of FIG. 3A.
Figure 3B:
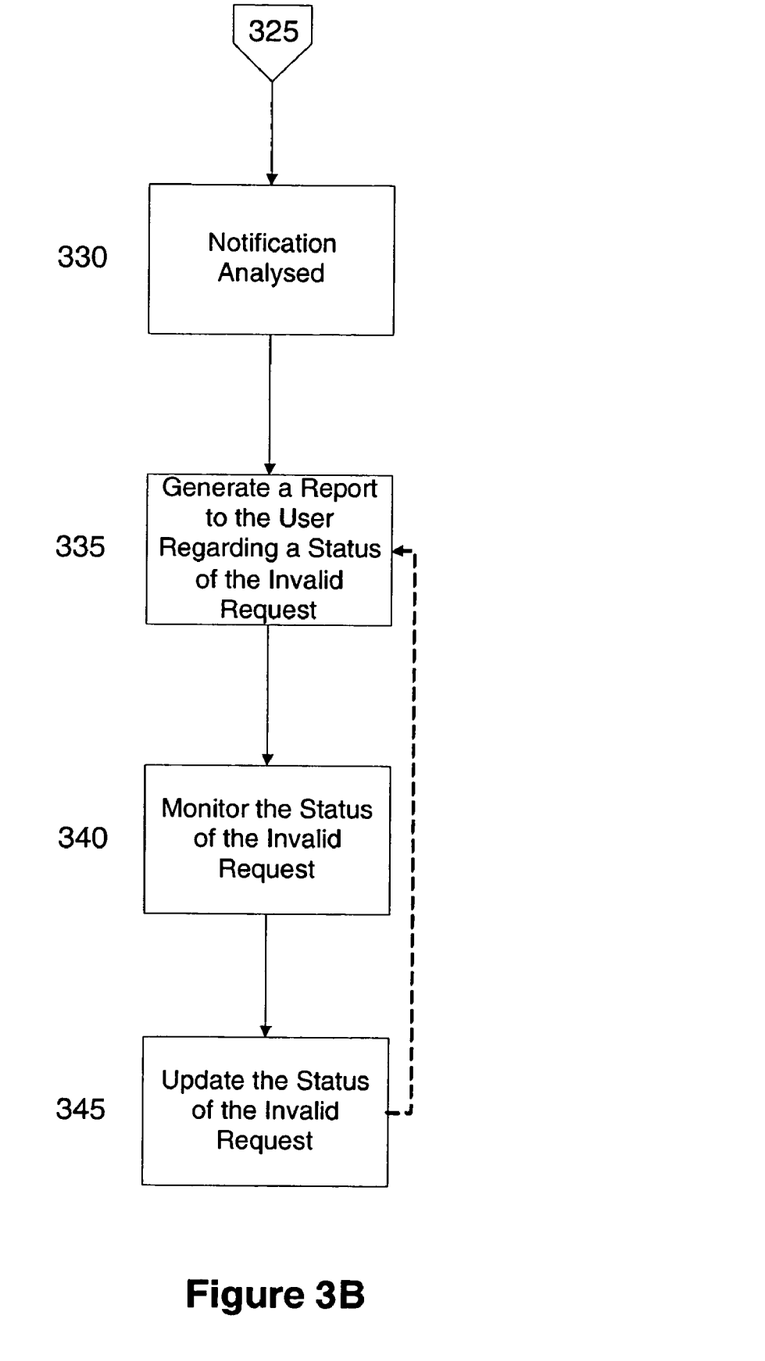

In a further example, as shown in FIGS. 3A and 3B, the generation of the notification associated with the indication of the invalid request can be sent from the processing system 200 (which in this example, is the user's terminal) to a second processing system (which can be similar to the processing system 200), and/or to a central server.

As shown in FIG. 3A, steps 300 to 320 correspond to steps 100 to 120 of FIG. 1. At step 325, the notification associated with the indication of an invalid request is received by a second processing system, server and/or central server.

In the situation where a central server receives the notification, at step 330, the server analyses the notification of the invalid request. Thus, the server may determine whether similar notifications have been received from other users in respect of similar data. In one example, the analysis performed by the central server may include determining if multiple users have received similar phishing emails, and determining a level or status of invalidity in respect of the indication.

At step 335, the central server has the option of generating a report (which can include sending the analysis of the notification) to the user with respect to a determined, calculated or estimated status or level of the invalidity of the request. Thus, for example, if it is determined that an email received by the user is a phishing email, and that other users have also received similar emails, then the central server may report to the user that there is a high likelihood that the email received by the user is a phishing email, and that the user should be alert when responding to or taking action in respect of the email. Notably, the report can also be sent to a third party or other affected users.

In another example, the central server can also monitor the status of the invalid request at step 340, and update the status of the invalid request at step 345, accordingly. Thus, for example, if it is initially determined that there is a low likelihood of the email being a phishing email, the email can be quarantined, until a further time, where the processing system re-checks to see if other users have also received similar suspicious emails, and updates the status or the level of invalidity of the email (to, for example, high or medium or very low). If the status of the invalidity is updated, then the central server can optionally return to step 335 and generate a further report to the user.

Thus, for example, a user may receive an assessment which informs the user that an email is slightly suspect, but no other emails of this same kind have been received, and the user is requested to wait for a period of time, and if the assessment has not changed in any significant way, then this would give the user some confidence that the email is not part of a mass phishing attack. Accordingly, any updates with respect to the status of invalid request or indication of an invalid request can be communicated to the user.

Notably, the status of invalid request or the indication of an invalid request can be updated due to different events, such as third parties or other users alerting the central server in respect of phishing attempts.

Accordingly, the above described method and system can be used to determine an indication of an invalid request.

FURTHER EXAMPLES

Further example implementations of the above-described system and method are now described in more detail. The following examples provide a more detailed description of particular embodiments. The examples are intended to be merely illustrative and not limiting to the scope of the present invention.

Example 1

In this example, automatic or semi-automatic reporting of suspect phishing emails and user feedback for emails detected, identified or determined to be suspect can be sent from a central server to all users of a software product, for example a software security or anti-malware product. The method/system provides greater speed and accuracy for identifying phishing emails, as the results can be correlated on a central server. The steps of the process are described below:

1) Heuristic detection techniques are used to trigger identification of an email that is suspect (either automatically or as accepted by a user). Heuristic techniques can include, but are not limited to:
    a) If there is a geographical discrepancy between elements on the email;
    b) If there is a difference between the text of the link and the actual link;
    c) The presence of particular keywords within the email;
    d) The presentation of the email message in a large image which if selected is linked to either a website or another email address, variations of this also attempts to display different misleading links that vary from the destination if clicked;
    e) The links are not listed as a part of a public domain.
2) The suspect email is sent to a central server.
3) On the central server, the email is firstly checked to see whether the email has already been detected and if this is the case, the status of the email is reported including the volume or the number of occurrences of the attack (that is, the number of times various users have received the email). If the email is not reported at the highest level of warning, then the email and user/customer from which the email was acquired is stored in a database for ongoing monitoring. The email can also be checked to see if the phishing website has been taken down or offline.
4) If the email has not been detected before, then the email is analysed and stored in a database. The user is given a warning based on the type of suspect features the email exhibits. If the email is not reported at the highest level of warning, then the email and user/customer from which the email was acquired is stored in a database for ongoing monitoring.
5) In steps (3) and (4) above, a report may be sent to the user/customer, and can include but is not limited to one or more of the following actions:
    a) When heuristic rules produces a false positive, this information is added to a whitelist on the server and/or client terminal;
    b) Informing the user of the suspect behaviour of the phishing email;
    c) Informing the user of volume of emails found;
    d) When a new phishing email is found, the new phishing email is added to a central database or a client-side database so that if the server cannot be contacted or the threat is at the highest level the client program can offer protection;
    e) Alert authorities of the scam;
    f) Alert other users;
    g) Alert third parties.
6) Each time new emails are received, all the emails in the monitoring database for the same phishing scam are checked and when certain significant changes occur in the nature of the scam, such as the seriousness of the attack or steps up in the volume of the phishing emails, the change in status of the phishing email can be reported to the user.
7) When users delete a phishing email then a message is sent to the server and the monitoring of the email ceases. If a user has more than a certain number of emails monitored then the oldest emails also can be removed from monitoring. After a certain period of time when a scam reaches a steady state warning, level monitoring may also cease.
8) Optionally, a human operator may also check the analysis results, performed in steps (3) and (4) above.
9) The user's processing system or terminal may monitor emails being received and indicate their warning level, the last update of the warning level, and the characteristics of the email that caused the email to be classified as a threat.
10) URLs from other anti-phishing organisations can also be added to the system.
11) The user may specify the threat level at which they would like action taken, such as the deletion, quarantine, moving of the email to a special folder or the blocking of associated websites.

Example 2

In this example, a database of legitimate entities is used to more accurately determine phishing emails.

In this example, the system/method checks emails for any possible signs which connect the email to a list of organisations who are to be protected by the system. Accordingly, a database can store information in respect of organisations which are to be protected by the system, where the database can be periodically updated with changes in an organisation's details. If an email is suspected to be connected to one of these protected organisations, then particular rules can be used to check if the email is a phishing email. These rules use the database to perform more intense checking that is possible because of the information in the database. The email may also be reported back to a central server.

In this example, the following steps are performed when an email is received:

1) Using specified rules, check the email in order to determine whether the email has been sent by a known user. The rules may include but are not limited to:
    a) Is the link, text, or any of any part of the email connected to one of the protected organisations as stored in the database ?
    b) Check for keywords, terms, or conjunction of terminology that may indicate that the user may be the subject of a phishing scam.

c) Are any images used in the email identical to images on a protected organisation's website ? (eg. could the image have been copied from the website)
d) Is the logo a protected organisation's logo (see method 3 below) ?
2) If any of the rules (in step 1) are triggered then further aspects of the email can be checked in detail using rules such as, but not limited to:
   a) links are checked in case there are any links that do not correspond to the correct IP range, owner, or geographical location of the organisation as specified as valid in the database.
   b) if an organisation specifies that no email has been sent by them.
   c) does the email contain an attached executable file.
   d) does the email contain a spelling mistake.
   e) does an image include a hyperlink that does not correspond to the organisation's website or a correct IP range. Such a link could be prevented from being activated.
   f) email did not come from the same domain as the domain specified by the organisation.
   g) sets of words that would never appear in an email as discussed in step 1(b) are found.
   h) rules are triggered for word groups that should not appear in an email, such as, for example, "account", "security", "transaction", "please contact", "Sincerely", "attachment".
   i) rules are triggered for word groups that should appear in the email.
   j) if the email is missing a disclaimer, or any other automated terms.

Example 3

In this example, image based detection (or image processing) is used to detect emails related to legitimate entities or protected organisations, in order to enable detection of possible references to protected organisations.

This process is particularly advantageous in the situation where a logo used in the email is not referenced from or linked to the legitimate company's website. Thus, the logo used is matched against a trusted logo and it is determined whether or not the logo used if the potential phishing email has been altered to some degree. The process generally includes the following steps:
1) Storing an image in a database of protected organisations.
2) Checking images in emails against the images stored in the database in order to determine whether the images used in an email are illegitimate. This could involve optimised methods of partially checking the images in order to eliminate which images are probably not stored in the database.

In this example, a possible implementation is to store the percentage of the four major colours which compose the trusted image or logo, which would be used to quickly compare against images in emails for an approximate match. If a possible match is found then further image processing techniques can be used to determine whether there has been an illegitimate reproduction of the logo.

Furthermore, in order to further optimise the process, only selected images of an email may be checked, and in one example, only the images near the top or header of an email are checked, as this is usually where the logo of an organisation is placed.

It will be appreciated that the above-described system and method can allow for an integrated approach, which combines automatically analysing a possible phishing email using heuristics, reporting the complete email to a central server for analysis, and providing the user with feedback relating to the email based on what is already known plus any new information obtained from the newly submitted email. This approach could also include a feature to track the changing status of any decisions/levels concerning the submitted email and report changes in an assessment level.

The above-described method and system can provide the following advantages:
1) The system and method is relatively fast in determining new attacks (that is new phishing emails)—Without being slowed down by users needing to report emails (where delays are generally caused due to the requirements of having a person read their emails first, recognise that an email is a phishing email, and report the email as a phishing email). This process of relying on users to report phishing emails suffers numerous disadvantages, such as it is often the case that users fail to recognise phishing emails, or if they do recognise phishing emails, they do not report the emails.
2) Users and user terminals are protected more efficiently—due to the use of heuristics in combination with the feed back system (that is, the central server feeding back information to the user's terminal).
3) Faster detection of phishing emails where the links have been varied so that website blocking does not initially catch the email. When the content matches an existing email, then even if the link is varied the email can still be detected straight away.
4) Improved accuracy—heuristics in combination with correlating the results with a central server allows for improved accuracy as the central server may know the frequency of the instances of an attack. Also, by using heuristics at the front end, the number of false positives reported to the server, and consequently reported by the server, may be reduced.
5) A fast response to the individual email itself—the determination of an invalid request within an email can allow for a fast response to the email (uploaded into the response, in a signature or the like). Furthermore, any updated information with respect to the email can be immediately reported.
6) Decision transparency and updates—it is possible that the email received may initially be assessed as harmless, but as similar emails are subsequently received by users then the level of illegitimacy may increase.

Thus, in accordance with the above-described system and method, there has been provided a system and method for determining an indication of an invalid request.

The present invention may be implemented separately as stand-alone software or in combination with currently known systems/methods as a software package. When the present invention is embodied as a software package, this software package also can be used to detect and remove malware from a processing system or device, such as a computer, computer system, PDA, mobile or cellular telephone, or a wide variety of other similar devices.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, or an embodiment combining software and hardware aspects.

The invention claimed is:

1. A computer-implemented method of determining an indication of an invalid request, the method comprising:
    a) receiving data at a first processing system, wherein the received data comprises electronic mail;
    b) comparing at least a portion of the received data to predetermined criteria at the first processing system, wherein the comparison occurs prior to the received data being accessed by a recipient of the data;
    c) determining an indication of an invalid request included in the data at the first processing system;
    d) generating, at the first processing system, a notification in accordance with the determined indication of the invalid request;
    e) transmitting the data and the notification from the first processing system to a second processing system, wherein the notification indicates the determined indication of the invalid request;
    f) transmitting, from the second processing system, a status level of the invalid request to the first processing system, wherein the status level indicates an amount of notifications that have been previously received by the second processing system from at least one processing system that is different from the first processing system;
    g) determining if the status level of the invalid request satisfies a threshold;
    h) upon determining that the status level of the invalid request does not satisfy the threshold, blocking access to the data and storing the data and the notification in a database, wherein the notification is sent to the recipient of the data upon the status level satisfying the threshold.

2. The method of claim 1, wherein the method further includes, in the second processing system:
    a) analysing the notification; and,
    b) generating a report in accordance with the analysis.

3. The method of claim 2, wherein the method further includes in the second processing system:
    a) monitoring a status of the invalid request; and,
    b) updating the status of the invalid request.

4. The method of claim 1, wherein the predetermined criteria includes whether the data includes any one or combination of:
    a) a trusted logo;
    b) a particular image;
    c) a particular keyword;
    d) a particular term;
    e) a hyperlink;
    f) an attached executable file;
    g) a spelling mistake;
    h) a particular domain;
    i) a particular Internet Protocol address; and,
    j) a particular Internet Protocol owner.

5. The method of claim 1, wherein the predetermined criteria includes whether the data does not include any one or combination of:
    a) a trusted logo;
    b) a particular image;
    c) a particular keyword;
    d) a particular term;
    e) a hyperlink;
    f) an attached executable file;
    g) a spelling mistake;
    h) a particular domain;
    i) a particular Internet Protocol address; and,
    j) a particular Internet Protocol owner.

6. The method of claim 1, wherein generating the notification of the invalid request includes notifying a user of the invalid request.

7. The method of claim 1, wherein the second processing system is a central server.

8. The method of claim 2, wherein analysing the notification includes:
    a) determining if similar notifications have been received from other users in respect of similar data; and,
    b) determining a status invalidity.

9. The method of claim 2, wherein generating a report in accordance with the analysis includes any one or combination of:
    a) notifying affected users of the status of the invalidity; and,
    b) notifying a third party of the status of the invalidity.

10. The method of claim 3, wherein monitoring the status of the invalid request includes:
    a) storing the data as quarantined data; and,
    b) determining if similar notifications have been received from other users in respect of similar data.

11. The method of claim 3, wherein the method further includes sending a report to a user in accordance with the updated status of the invalid request.

12. The method of claim 1, wherein it is determined whether the data is a phishing email.

13. A processing system for determining an indication of an invalid request, the processing system comprising:
    a processor;
    memory in electronic communication with the processor;
    the processor configured to:
        receive data at a first processing system, wherein the received data comprises electronic mail;
        compare at least a portion of the received data to predetermined criteria at the first processing system, wherein the comparison occurs prior to the received data being accessed by a recipient of the data;
        determine an indication of an invalid request included in the data at the first processing system;
        generate, at the first processing system, a notification in accordance with the determined indication of the invalid request;
    an output device configured to transmit the data and the notification from the first processing system to a second processing system, wherein the notification indicates the determined indication of the invalid request;
        transmit, from the second processing system a status level of the invalid request to the first processing system, wherein the status level indicates an amount of notifications that have been previously received by the second processing system from at least one processing system that is different from the first processing system;
        determine if the status level of the invalid request satisfies a threshold;
        upon determining that the status level of the invalid request does not satisfy the threshold, block access to the data and store the data and the notification in a database, wherein the notification is sent to the recipient of the data upon the status level satisfying the threshold.

14. A computer program product for determining an indication of an invalid request, the computer program product comprising a non-transitory computer-readable medium having instructions thereon, the instructions comprising:
  a) code programmed to receive data at a first processing system, wherein the received data comprises electronic mail;
  b) code programmed to compare at least a portion of the received data to predetermined criteria at the first processing system, wherein the comparison occurs prior to the received data being accessed by a recipient of the data;
  c) code programmed to determine an indication of an invalid request included in the data at the first processing system;
  d) code programmed to generate, at the first processing system, a notification in accordance with the determined indication of the invalid request;
  e) code programmed to transmit the data and the notification from the first processing system to a processing system, wherein the notification indicates the determined indication of the invalid request;
  f) code programmed to transmit, from the second processing system a status level of the invalid request to the first processing system, wherein the status level indicates an amount of notifications that have been previously received by the second processing system from at least one processing system that is different from the first processing system;
  g) code programmed to determine if the status level of the invalid request satisfies a threshold;
  h) upon determining that the status level of the invalid request does not satisfy the threshold, code programmed to block access to the data and store the data and the notification in a database, wherein the notification is sent to the recipient of the data upon the status level satisfying the threshold.

15. A computer-implemented method of determining a level of invalidity, the method including the steps of, in a first processing system:
  a) receiving a notification from a second processing system, wherein the notification comprises an indication of an invalid request included in electronic mail;
  b) transmitting, from the first processing system, a status level of the invalid request to the second processing system, wherein the status level comprises the indication of the invalid request and indicates an amount of notifications that have been previously received by the first processing system from at least one processing system that is different from the second processing system;
  c) analysing the indication of the invalid request, wherein the analysis occurs prior to the electronic mail being accessed on the second processing system;
  d) determining if the status level of the invalid request satisfies a threshold; and
  e) upon determining that the status level of the invalid request does not satisfy the threshold, blocking access to the data and storing the data and the notification in a database, wherein the notification is sent to the second processing system upon the status level satisfying the threshold.

16. A computer-implemented method of determining an indication of an invalid request, the method comprising:
  a) receiving data at a first processing system, wherein the received data comprises electronic mail;
  b) comparing at least a portion of the received data to predetermined criteria at the first processing system, wherein the comparison occurs prior to the received data being accessed by a recipient of the data;
  c) determining an indication of an invalid request included in the data at the first processing system;
  d) sending a notification in accordance with the determined indication of the invalid request to a central server, wherein the notification indicates the determined indication of the invalid request;
  e) receiving, from the central server a status level of the invalid request to the first processing system, wherein the status level indicates an amount of notifications that have been previously received by the central server from at least one processing system that is different from the first processing system;
  f) determining if the status level of the invalid request satisfies a threshold;
  g) upon determining that the status level of the invalid request does not satisfy the threshold, blocking access to the data and storing the data and notification in a database, wherein the notification is sent to the recipient of the data upon the status level satisfying the threshold.

* * * * *